United States Patent
Masalha et al.

(10) Patent No.: US 12,475,118 B2
(45) Date of Patent: Nov. 18, 2025

(54) DATABASE TABLE JOINING UNDER FULLY HOMOMORPHIC ENCRYPTION

(71) Applicant: International Business Machines Corporation, Armonk, NY (US)

(72) Inventors: Ramy Masalha, Kafr Qari (IL); Allon Adir, Kiryat Tivon (IL); Hayim Shaul, Kfar Saba (IL); Ehud Aharoni, Kfar Saba (IL); Omri Soceanu, Haifa (IL); Nir Drucker, Zichron Yaakov (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 18/618,074

(22) Filed: Mar. 27, 2024

(65) Prior Publication Data
US 2025/0307242 A1    Oct. 2, 2025

(51) Int. Cl.
G06F 16/2453    (2019.01)
H04L 9/00    (2022.01)

(52) U.S. Cl.
CPC ........ *G06F 16/24537* (2019.01); *H04L 9/008* (2013.01)

(58) Field of Classification Search
CPC ............................ G06F 16/24537; H04L 9/008
See application file for complete search history.

(56) References Cited

U.S. PATENT DOCUMENTS 9,722,777 B2   8/2017   Payton et al.
9,747,456 B2   8/2017   Arasu et al.
2008/0126359 A1*   5/2008   Rhoads ................. H04L 67/563
2018/0307687 A1*   10/2018   Natkin .................. G06F 16/248
2022/0253989 A1*   8/2022   Tseng ..................... G06T 3/4092
2023/0090900 A1   3/2023   Kikuchi et al.
(Continued)

FOREIGN PATENT DOCUMENTS

WO    2023/233516 A1    12/2023

OTHER PUBLICATIONS

Asharov et al. "Secure Statistical Analysis on Multiple Datasets : Join and Group-By", CCS, Copenhagen, Denmark, 2023, 15 pages.
(Continued)

*Primary Examiner* — Aleksandr Kerzhner
*Assistant Examiner* — Aryan D Toughiry
(74) *Attorney, Agent, or Firm* — Garg Law Firm, PLLC; Rakesh Garg; Anthony Mauricio Pallone

(57) ABSTRACT

An embodiment appends, into a concatenated table, a second plurality of records in a second table to a first plurality of records in a first table. An embodiment sorts, according to each identification value in the concatenated table, the concatenated table. An embodiment generates, using an equality mask derived from each identification value in the sorted table, an intersection table, the intersection table comprising a record in the first plurality of records with a first identifier value matching a second identifier value in a record in the second plurality of records. An embodiment generates, using a not-in-intersection mask derived from the equality mask, a not-in-intersection table. An embodiment adds contents of the intersection table and contents of the not-in-intersection table together, resulting in a join table.

20 Claims, 14 Drawing Sheets

(56) References Cited

U.S. PATENT DOCUMENTS

| | | | | |
|---|---|---|---|---|
| 2023/0146149 A1* | 5/2023 | Moon | ............... | H04L 9/008 380/28 |
| 2023/0244661 A1* | 8/2023 | Khurana | ............. | G06F 16/2365 707/715 |
| 2024/0256541 A1* | 8/2024 | Gladwin | ........... | G06F 16/24537 |

OTHER PUBLICATIONS

Bian et al. "HE3DB: An Efficient and Elastic Encrypted Database Via Arithmetic-And-Logic Fully Homomorphic Encryption", CCS '23: Proceedings of the 2023 ACM SIGSAC Conference on Computer and Communications Security, Nov. 21, 2023, pp. 2930-2944.

Cetin et al. "Homomorphic Sorting with Better Scalability", IEEE Transactions on Parallel and Distributed Systems, 2020, 12 pages.

Hong et al. "Efficient Sorting of Homomorphic Encrypted Data with k-way Sorting Network", IEEE Transactions on Information Forensics and Security, Aug. 20, 2021, pp. 4389-4404, vol. 16.

Krastnikov et al. "Efficient Oblivious Database Joins", arXiv:2003.09481v3 [cs.DB], Dec. 15, 2020, 14 pages.

Lepoint et al. "Private join and compute from PIR with default", Advances in Cryptology—ASIACRYPT, Oct. 2, 2021, pp. 605-634.

Popa et al. "CryptDB: Protecting Confidentiality with Encrypted Query Processing", SOSP, Oct. 2011, 16 pages.

Shafieinejad et al. "Equi-Joins Over Encrypted Data for Series of Queries", arXiv:2103.05792v1 [cs.CR], Mar. 10, 2021, 15 pages.

Tajima et al. "Outsourced Private Set Intersection Cardinality with Fully Homomorphic Encryption", 2018 6th International Conference on Multimedia Computing and Systems (ICMCS), May 2018, 8 pages.

\* cited by examiner

*Fig. 6*

PSEUDOCODE 610 for stage : network
1. ctt_rot = ctt.rot(stage.dist)
2. minimums = (ctt < ctt_rot) * ctt + (ctt > ctt_rot) * ctt_rot
3. maximums = ctt + ctt_rot – minimums
4. maximums = maximums.rot(-stage.dist)
5. ctt = ctt * not_touched_mask + maximums * maximums_mask + minimums * minimums_mask

PSEUDOCODE 620 for stage : network
1. salary_rot = salary.rot(stage.dist)
2. minimums = (ctt < ctt_rot) * salary + (ctt > ctt_rot) * salary_rot
3. maximums = salary + salary_rot – minimums
4. maximums = maximums.rot(-stage.dist)
5. salary = salary * not_touched_mask + maximums * maximums_mask + minimums * minimums_mask

*Fig. 7*

MASK SET 710

| BOTTOM THEN BOTTOM $mask_{1,-1}$ | BOTTOM THEN NOT TOUCHED $mask_{1,0}$ | BOTTOM THEN TOP $mask_{1,1}$ | NOT TOUCHED THEN BOTTOM $mask_{0,-1}$ | NOT TOUCHED THEN NOT TOUCHED $mask_{0,0}$ | NOT TOUCHED THEN TOP $mask_{0,1}$ | TOP THEN BOTTOM $mask_{1,-1}$ | TOP THEN NOT TOUCHED $mask_{1,0}$ | TOP THEN TOP $mask_{1,1}$ |
|---|---|---|---|---|---|---|---|---|
| 0 | 0 | 0 | 0 | 1 | 0 | 0 | 0 | 0 |
| 0 | 0 | 0 | 0 | 1 | 0 | 0 | 0 | 0 |
| 0 | 0 | 0 | 0 | 0 | 1 | 0 | 0 | 0 |
| 0 | 0 | 0 | 0 | 0 | 1 | 0 | 0 | 0 |
| 0 | 0 | 0 | 0 | 0 | 0 | 1 | 0 | 0 |
| 0 | 0 | 0 | 0 | 0 | 0 | 1 | 0 | 0 |
| 0 | 0 | 0 | 0 | 0 | 0 | 0 | 0 | 1 |
| 0 | 0 | 0 | 0 | 0 | 0 | 0 | 0 | 1 |
| 1 | 0 | 0 | 0 | 0 | 0 | 0 | 0 | 0 |
| 1 | 0 | 0 | 0 | 0 | 0 | 0 | 0 | 0 |
| 0 | 0 | 1 | 0 | 0 | 0 | 0 | 0 | 0 |
| 0 | 0 | 1 | 0 | 0 | 0 | 0 | 0 | 0 |
| 0 | 0 | 0 | 1 | 0 | 0 | 0 | 0 | 0 |
| 0 | 0 | 0 | 1 | 0 | 0 | 0 | 0 | 0 |
| 0 | 0 | 0 | 0 | 1 | 0 | 0 | 0 | 0 |
| 0 | 0 | 0 | 0 | 1 | 0 | 0 | 0 | 0 |

SORTING NETWORK 700 — STAGE 1, STAGE 2

Fig. 8

PSEUDOCODE 810 for stage1, stage2 : network
1. d1,d2 := distance of stage1, stage2 (respectively)
2. ctt2 := the output of stage1 in the pseudocode 610
3. $ctt_{rot}, ctt2_{rot} := rot(ctt,d1), rot(ctt2, d2)$
4. $i_{<,<} := (ctt < ctt_{rot}) * (ctt2 < ctt2_{rot})$
5. $i_{<,>} := (ctt < ctt_{rot}) * (ctt2 > ctt2_{rot})$
6. $i_{>,<} := (ctt > ctt_{rot}) * (ctt2 < ctt2_{rot})$
7. $i_{>,>} := (ctt > ctt_{rot}) * (ctt2 > ctt2_{rot})$
8. Clean $i_{<,<}, i_{<,>}, i_{>,<}, i_{>,>}$ using a noise-cleaning polynomial.
9. res := Enc(0)
10. foreach $mask_{a,b}$ where a, b ∈ {-1,0,1}
    if (a, b) == (-1, -1):
      res += $mask_{a,b}$ * (ctt * $i_{>,>}$ + rot(ctt,d1) * $i_{<,>}$ + rot(ctt,d2) * $i_{>,<}$ +rot(ctt, d1 + d2) * $i_{<,<}$
    if (a, b) == (-1, 0):
      res += $mask_{a,b}$ * (ctt * (ctt > $ctt_{rot}$) + rot(ctt,d1) * (ctt < $ctt_{rot}$))
    if (a, b) == (-1, 1):
      res += $mask_{a,b}$ * (ctt * $i_{>,<}$ + rot(ctt,d1) * $i_{<,<}$ + rot(ctt,d2) * $i_{>,>}$ +rot(ctt, d1 + d2) * $i_{<,>}$
    if (a, b) == (0, -1):
      res += $mask_{a,b}$ * (ctt * (ctt > rot(ctt,d2)) + rot(ctt,d2) * (ctt < rot(ctt,d2)))
    if (a, b) == (0, 0):
      res += $mask_{a,b}$ * ctt
    if (a, b) == (0, 1):
      res += $mask_{a,b}$ * (ctt * (ctt < rot(ctt,d2)) + rot(ctt,d2) * (ctt > rot(ctt,d2)))
    if (a, b) == (1, -1):
      res += $mask_{a,b}$ * (ctt * $i_{<,>}$ + rot(ctt,d1) * $i_{>,>}$ + rot(ctt,d2) * $i_{<,<}$ +rot(ctt, d1 + d2) * $i_{>,<}$
    if (a, b) == (1, 0):
      res += $mask_{a,b}$ * (ctt * (ctt < $ctt_{rot}$) + rot(ctt,d1) * (ctt > $ctt_{rot}$))
    if (a, b) == (1, 1):
      res += $mask_{a,b}$ * (ctt * $i_{<,<}$ + rot(ctt,d1) * $i_{>,<}$ + rot(ctt,d2) * $i_{<,>}$ +rot(ctt, d1 + d2) * $i_{>,>}$
11. ctt ← res

DATABASE TABLE JOINING UNDER FULLY HOMOMORPHIC ENCRYPTION

BACKGROUND

The present invention relates generally to data management under fully homomorphic encryption (FHE). More particularly, the present invention relates to a method, system, and computer program for database table joining under FHE.

In a relational database or dataset, data is typically organized in one or more two-dimensional tables. Each table includes one or more rows, also referred to as records. Each table also includes one or more columns, also called attributes or fields. Rows represent instances (e.g., a particular customer in a table holding customer data) and columns represent values attributed to an instance (e.g., a particular customer's address or telephone number). Each row is identified by a unique key, or identifier. For example, in a table holding customer data, each customer might be assigned a unique customer number, and each customer's number might be stored in a designated column of the table. Data in a relational database is typically stored, manipulated, and accessed using Structured Query Language (SQL) commands.

FHE enables computations on encrypted data without decrypting the data on which the computations are being performed. Results of the computations are left in an encrypted form which, when decrypted, result in an output that is identical to that produced had the operations been performed on the unencrypted data. For example, under FHE two encrypted numbers can be added together, resulting in an encrypted sum. The encrypted sum, when decrypted, is identical to the sum of the two original (i.e., not encrypted) numbers. FHE typically supports addition and multiplication operations (because any polynomial can be computed with just these two operations), as well as data movement operations such as rotating data from one row of a database table to a higher or lower row. The results of additional operations, such as data comparison and noise removal, can be estimated using appropriate polynomials.

Clients often store data in third parties' servers. To avoid revealing non-public data to unauthorized parties, data is often stored and manipulated in third parties' servers under FHE. In a typical FHE implementation, a database owner stores FHE-encrypted data at a storage provider or database server. A database server performs database operations on the encrypted data under FHE (thus preserving the encryption), and returns FHE-encrypted results to the database owner, who can decrypt the results using a private decryption key the database server does not have access to.

An often-performed operation on relational databases is joining the records of two different tables that share a key, for example using an SQL JOIN operation. Some versions of SQL support four different variations of the JOIN operation: 1) (INNER) JOIN returns records that have matching key values in both tables (i.e., the intersection of the two tables, and thus also referred to as an intersection table); 2) LEFT (OUTER) JOIN returns all records from the first table, and the matched records from the second table; 3) RIGHT (OUTER) JOIN returns all records from the second table, and the matched records from the first table; and 4) FULL (OUTER) JOIN returns all records when there is a match in either the first or second table (i.e., the union of the two tables, and thus also referred to as a join table. For example, one table might store employee salary data, and a second table might store employee age data. Both tables share a key—an employee number. Thus, an intersection table resulting from an (INNER) JOIN of the two tables would include a key or identifier column, a salary column, and an age column, with rows storing data for which there was both salary data in the first table and age data in the second table. Similarly, a join table resulting from a FULL (OUTER) JOIN of the two tables would include a key or identifier column, a salary column, and an age column, with rows storing data for which there was salary data in the first table, age data in the second table, or data for which there was both salary data in the first table and age data in the second table.

In a privacy-preserving setup, the database owner requests that the server holding two tables return an encrypted version of the tables' join. The two tables can belong to the same user or to two different users. If the tables being joined belong to different users, a Multi-Party FHE scheme, in which both parties need to confirm the decryption of the resulting join, is usable, but the FHE join operation itself does not change.

The illustrative embodiments recognize that existing methods of database table joining under FHE are insufficient. One existing method uses both Oblivious Transfer and Garbled Bloom Filter, two presently available techniques, as part of a privacy preserving multi-party join operation. However, this solution suffers from the inherent drawbacks of Oblivious Transfer (communication overheads and burden on the client side) and Bloom Filters (false positives and security issues).

Joins involving equality (equi-joins) and order checks (range joins) are presently available in a limited form. To minimize revealing information about the encrypted data, it should not be possible for a database server to join columns for which a join was not requested. Columns that are never joined should therefore be encrypted with different keys. If it is known in advance which columns are to be joined, the columns to be joined can be encrypted with the same key. However, if the columns to be joined are not known in advance, the columns must be re-encrypted with the same key prior to performing the join. Re-encryption is possible for equi-joins, but not for range joins.

Another presently available method uses an oblivious algorithm to perform equi-joins. The input tables T1 and T2 are expanded to produce S1 and S2, and S2 is aligned to S1. The output table is then readily obtained by "zipping" together values from S1 and S2. However, machine code implementing the algorithm, which is stored in memory, might still leak information about the data being processed.

Another presently available method implements a trivial join. In particular, a homomorphic inner join is composed of the Cartesian product of the two encrypted tables and the evaluation of the join condition, which can simply be implemented by the homomorphic comparison operator. However, evaluating a Cartesian product under FHE is time-consuming and can add noise to the result, and thus an improved method is needed. Another presently available method requires decrypting values associated with the join operation, but operating on decrypted data risks exposing the data to unauthorized parties.

Thus, the illustrative embodiments recognize that there is an unmet need for database table joining under FHE, that does not expose data in the tables being joined and is faster, less noisy, and uses fewer computing resources than existing methods.

SUMMARY

The illustrative embodiments provide a method for database table joining under FHE. An embodiment includes appending, into a concatenated table, a second plurality of records in a second table to a first plurality of records in a first table, wherein the first table and the second table each comprise an identification field storing an identification value, wherein the first plurality of records and the second plurality of records in the second table comprise fully homomorphic encrypted data. The embodiment includes sorting, according to each identification value in the concatenated table, the concatenated table, the sorting resulting in a sorted table. The embodiment includes generating, using an equality mask derived from each identification value in the sorted table, an intersection table, the intersection table comprising a record in the first plurality of records with a first identifier value matching a second identifier value in a record in the second plurality of records. The embodiment includes generating, using a not-in-intersection mask derived from the equality mask, a not-in-intersection table, the not-in-intersection table comprising a record in the first plurality of records with a third identification value failing to match any identification value in a record in the second plurality of records. The embodiment includes adding contents of the intersection table and contents of the not-in-intersection table together, the adding resulting in a join table. Thus, the embodiment provides a method implementing database table joining under FHE. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium. The program instructions, when executed on a computing device, cause the computing device to perform various ones of, and combinations of, the operations outlined above with regard to the method illustrative embodiment.

An embodiment includes a computer system. The computer system includes a processor, a computer-readable memory, and a computer-readable storage medium, and program instructions stored on the storage medium for execution by the processor via the memory. The program instructions which, when executed by the processor, cause the processor to perform various ones of, and combinations of, the operations outlined above with regard to the method illustrative embodiment.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of the illustrative embodiments when read in conjunction with the accompanying drawings, wherein:

FIG. 6 depicts example pseudocode used in implementing database table joining under FHE in accordance with an illustrative embodiment;

FIG. 7 depicts another example sorting network and masks used in implementing database table joining under FHE in accordance with an illustrative embodiment;

FIG. 8 depicts example pseudocode used in implementing database table joining under FHE in accordance with an illustrative embodiment;

DETAILED DESCRIPTION

Figure 1:
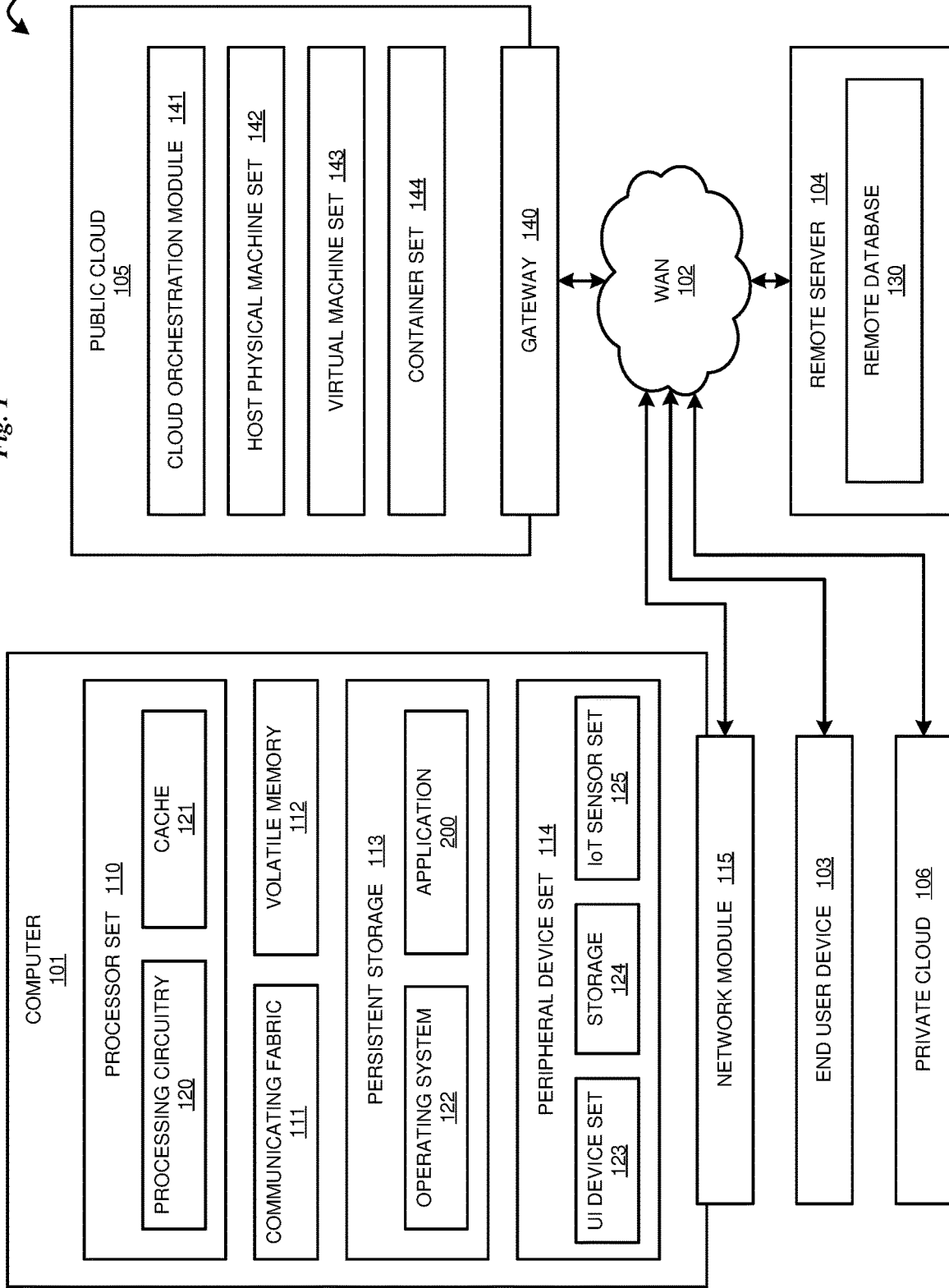
FIG. 1 depicts a block diagram of a computing environment in accordance with an illustrative embodiment.

The illustrative embodiments provide a method for database table joining under FHE. An embodiment includes appending, into a concatenated table, a second plurality of records in a second table to a first plurality of records in a first table, wherein the first table and the second table each comprise an identification field storing an identification value, wherein the first plurality of records and the second plurality of records in the second table comprise fully homomorphic encrypted data. The embodiment includes sorting, according to each identification value in the concatenated table, the concatenated table, the sorting resulting in a sorted table. The embodiment includes generating, using an equality mask derived from each identification value in the sorted table, an intersection table, the intersection table comprising a record in the first plurality of records with a first identifier value matching a second identifier value in a record in the second plurality of records. The embodiment includes generating, using a not-in-intersection mask derived from the equality mask, a not-in-intersection table, the not-in-intersection table comprising a record in the first plurality of records with a third identification value failing to match any identification value in a record in the second plurality of records. The embodiment includes adding contents of the intersection table and contents of the not-in-intersection table together, the adding resulting in a join table. Thus, the embodiment provides a method implementing database table joining under FHE. Other embodiments of this aspect include corresponding computer systems, apparatus, and computer programs recorded on one or more computer storage devices, each configured to perform the actions of the embodiment.

An embodiment further includes adding an adjustment value greater than zero and less than 0.5 to a value in the identification field of each of the plurality of records in the second table, the adding performed as a part of the appending. Thus, the embodiment provides additional detail of an adjustment value used in a method implementing database table joining under FHE.

In another embodiment, sorting the concatenated table comprises a plurality of stages, each stage in the plurality of stages comprising a result of comparing a plurality of pairs of identifier values in the sorted table. Thus, the embodiment provides additional detail of sorting the concatenated table used in a method implementing database table joining under FHE.

An embodiment further includes computing, by estimating a sign of a subtraction of a first identifier value in each of the plurality of pairs of identifier values from a second identifier value in the pair of identifier values, the results of comparing each of the plurality of pairs of identifier values, the estimating performed using a first polynomial. Thus, the embodiment provides additional detail of computing the results of comparing each of the plurality of pairs of identifier values in a method implementing database table joining under FHE.

An embodiment further includes removing, from the result of comparing a pair of identifier values in the sorted table, a portion of noise, the removing performed using a second polynomial. Thus, the embodiment provides additional detail of noise removal used in a method implementing database table joining under FHE.

In another embodiment, generating the intersection table comprises multiplying a first value in a first row of the equality mask by a second value in a corresponding row of a first field in the sorted table, the first field present in the first table. Thus, the embodiment provides additional detail of generating the intersection table in database table joining under FHE.

In another embodiment, generating the not-in-intersection table comprises multiplying a first value in a first row of the not-in-intersection mask by a second value in a corresponding row of a first field in the sorted table. Thus, the embodiment provides additional detail of generating the not-in-intersection table in database table joining under FHE.

The illustrative embodiments recognize that there is an unmet need for database table joining under FHE, that does not expose data in the tables being joined and is faster, less noisy, and uses fewer computing resources than existing methods. The present disclosure addresses the deficiencies described above by providing a process (as well as a system, method, machine-readable medium, etc.) that appends, into a concatenated table, a second plurality of records in a second table to a first plurality of records in a first table; sorts, according to each identification value in the concatenated table, the concatenated table; generates, using an equality mask derived from each identification value in the sorted table, an intersection table; generates, using a not-in-intersection mask derived from the equality mask, a not-in-intersection table; and concatenates contents of the intersection table and contents of the not-in-intersection table together, the concatenating resulting in a join table. Thus, the illustrative embodiments provide for database table joining under FHE.

An illustrative embodiment receives two tables to be joined under FHE. Each table has an identifier field and at least one other field (denoted by F1 for the first table and F2 for the second table). The identifier field holds a key shared between both tables. If the keys are not integers, an embodiment uses a presently available technique, such as unique hashing, to transform non-integer keys into corresponding integer keys. An embodiment's goal is to produce a third table with an identifier field, F1, and F2, including all the records of the first and second tables, such that if a record R1 of the first table and a record R2 of the second table have the same identifier, then the resulting table includes a single record R3 with that shared ID, and with fields F1 (from the first table) and F2 (from the second table). Because the tables include fully homomorphic encrypted data, the tables are to be joined under FHE, without decrypting data in the tables. To manipulate the tables, an embodiment uses a presently available FHE scheme that supports SIMD (Single-Instruction-Multiple-Data) operations including addition/subtraction and multiplication. Operations operate element-wise on pairs of vectors encrypted in corresponding pairs of ciphertexts. A rotation operation is also available. A rotation operation rotates row contents up or down within a table. For example, in a rotation up by 1 (e.g., denoted by rot (fieldName, 1)), for a particular field denoted by fieldName, data originally in row 0 of the table is moved to the last row of the table, data originally in row 1 is moved to row 0, data originally in row 2 is moved to row 1, and so on. Similarly, in a rotation down by 1 (e.g., denoted by rot (fieldName, −1)), for a particular field denoted by fieldName, data originally in row 0 of the table is moved to row 1, data originally in row 1 is moved to row 2, data originally in row 2 is moved to row 3, and so on.

An embodiment adds an adjustment value greater than zero and less than 0.5 to a value in the integer identification field of each of the plurality of records in the second table. One embodiment sets the adjustment value to 0.25. Using the adjustment value ensures that when identifier values are sorted, the records of the second table that correspond to identifiers that also occur in the first table consistently end up after the corresponding records of the first table.

After adding the adjustment value to a value in the identification field of each of the plurality of records in the second table, an embodiment appends the records in the second table to the records in the first table, thus generating a concatenated table. To add the adjustment value and append records, an embodiment uses one or more presently available data manipulation techniques under FHE. For example, if C1_ID denotes encrypted identifier field values of the first table, C2_ID denotes encrypted identifier field values of the second table, C1_F1 denotes encrypted F1 values of the first table, C2_F2 denotes encrypted F2 values of the second table, C3_ID denotes encrypted identifier field values of the concatenated table, C3_F1 denotes encrypted F1 values of the concatenated table, and C3_F2 denotes encrypted F2 values of the concatenated table, there are S records in the first table, and AV denotes the adjustment value, to generated the concatenated table one embodiment computes C3_ID=C1_ID+rot(C2_ID+AV, −S), C3_F1=C1_F1, and C3_F2=rot(C2_F2, −S). We assume here that all these ciphertexts have enough slots to fit the joined table, and that unused slots are 0. So initially just the "upper" S slots of all these ciphertexts hold the relevant values and the "lower" S slots are 0. When we rotate C2_ID down by S, we get the values in the lower S slots and the upper S slots are 0. When we add this to the unrotated C1_ID we get C3_ID with 2S values in both upper and lower slots.

An embodiment appends an adjustment value column to the concatenated table. In the column, if a row has an identifier value with an added adjustment value, the column holds the adjustment value. If a row has an identifier value without an added adjustment value, the column holds a zero. The added column is used as described elsewhere herein to remove the added adjustment value from values in the identification field of each of the plurality of records in the second table.

An embodiment sorts the concatenated table according to each identification value in the concatenated table. To sort the concatenated table under FHE, an embodiment uses a sorting network, a presently available technique. A sorting network is an abstract device including a fixed number of wires and comparators (also called connectors) connecting pairs of wires. Wires can be thought of as running from left to right, carrying values (one per wire) that traverse the network all at the same time. Each comparator connects two wires. When a pair of values, traveling through a pair of wires, encounter a comparator, the comparator swaps the values if and only if the top wire's value is greater or equal to the bottom wire's value. Thus, if the top wire carries x and the bottom wire carries y, then after hitting a comparator the top wire carries x'=min (x, y) and the bottom wire carries y'=max (x, y), so the pair of values is sorted. The connectors of a sorting network are grouped into stages such that every stage includes a sequence of connectors that sort different wires. For example, in a sorting network with inputs 1, 2, 3, and 4 (in order from top to bottom), a first comparator connecting inputs 1 and 3, and a second comparator connecting inputs 2 and 4, these two comparators constitute one stage because the comparators sort different pairs of wires. However, a third comparator also connecting input 1 to another wire cannot be a member of the first stage because the output of the third comparator relies on a result of the first comparator. Comparators that are in the same stage can be computed concurrently because the comparators do not rely on each other's results. A span, or stage distance, of a connector is the number of wires the connector spans minus one. For example, in a sorting network with a first comparator connecting inputs 1 and 3, the span of this comparator is two because the comparator spans three wires (inputs 1, 2, and 3). For case of computation, we assume that the spans of all the connectors in any given stage are equal. Some non-limiting examples of suitable sorting networks that meet this assumption are the Batcher odd-even merge-sort, bitonic sort, and the Pairwise sorting network.

Thus, to sort the concatenated table according to each identification value in the concatenated table, under FHE using a sorting network, an embodiment sorts rows in the table stage by stage, at each stage rotating contents of the table's identifier field by the span of the stage and then comparing the original and rotated columns (as vectors). To compare contents of two columns under FHE, an embodiment uses a polynomial estimating a Sign function, defined as: Sign(x)=1 if x is negative and 0 otherwise. An embodiment uses the polynomial estimating the Sign function to generate an indicator vector, by defining a LessThan function as: LessThan(X, Y)=Sign (X−Y). As a result, LessThan ( ) indicates 1 in vector entries where X<Y for the corresponding vector entries of X and Y, and 0 otherwise. Similarly, an embodiment uses the polynomial estimating the Sign function to generate another indicator vector, by defining a GreaterThan function as: GreaterThan(X, Y)=Sign(Y−X). As a result, GreaterThan( ) indicates 1 in vector entries where X>Y for the corresponding vector entries of X and Y, and 0 otherwise.

An embodiment encodes connectors of each stage of a sorting network into a minimums mask, a maximums mask, and a not_touched mask. The minimums mask encodes a vector with all 0s except 1s in all the indexes that correspond to the high-placed wires of the connectors of the stage, i.e. to the wires that should hold the lesser of the values compared by the connector. Similarly, the maximums mask encodes a vector with all 0s except 1s in all the indexes that correspond to the low-placed wires of the connectors of the stage, i.e. to the wires that should hold the larger of the values compared by the connector. The not_touched mask encodes a vector with all 0s except 1s in all the indexes that are not connected by any connector of the stage. The minimums mask and maximums mask ensure that all the positions that are not connected by any connector in the stage will be 0 in both minimums and maximums, and thus will remain in place. For each stage, an embodiment denotes input contents of the table's identifier field as the ctt ciphertext variable, and rotates contents of the table's identifier field by the span of the stage, generating the ciphertext variable ctt_rot. An embodiment computes a minimums variable, a vector where the lesser values attached to connectors of the stage are placed in the lower positions of the connectors, using the expression minimums=(ctt<ctt_rot)*ctt+(ctt>ctt_rot)*ctt_rot. An embodiment computes a maximums variable, a vector where the greater values attached to connectors of the stage are placed in the higher positions of the connectors, using the expression maximums=ctt+ctt_rot−minimums, then rotating the maximums variable by the negative of the span of the stage. An embodiment computes contents of the identifier column using the expression ctt=ctt*not_touched_mask+maximums*maximums_mask+minimums*minimums_mask, thus implementing the sorting. For another field in the concatenated table, an embodiment rotates contents of the field (denoted by the variable field) by the span of the stage, computes a minimums variable using the expression minimums=(ctt<ctt_rot)*field+(ctt>ctt_rot)*field_rot, and a maximums variable, using the expression maximums=field+field_rot−minimums, then rotating the maximums variable by the negative of the span of the stage. Note that the indicators (ctt<ctt_rot) and (ctt>ctt_rot) need not be recomputed for each field. Then an embodiment computes contents of the column using the expression field=field*not_touched_mask+maximums*maximums_mask+minimums*minimums_mask, thus implementing the sorting according to the identifier field. Note that the sorting is implemented without decrypting contents of the concatenated table, using only operations supported under FHE.

Because comparing contents of two columns under FHE requires use of a polynomial estimating a Sign function, each comparison results not in an integer zero or one, but instead in a real number close to zero or one (e.g., 0.01 or 0.99). Thus, each comparison result can be thought of as an integer zero or one plus an amount of noise. The adjustment value is selected to ensures that when identifier values are sorted, the records of the second table that correspond to identifiers that also occur in the first table end up after the corresponding records of the first table even after added noise is taken into account. In addition, because every sorting network stage requires comparisons, noise accumulates after every stage. An embodiment uses a noise-cleaning polynomial, a presently available technique, to remove a portion of noise from the comparison result after one or more sorting network stages.

Another embodiment combines sorting network stages together, to reduce the need for post-stage noise removal and reduce the accumulated noise of the sorting network stages. In particular, to combine two sorting network stages, an embodiment defines nine masks, each encoding a combination of wire location after the first stage and a wire location after the second stage. Then, for each pair of stages, an embodiment starts by executing the first stage on the table's identifiers column to get a temporary identifiers column. Then, an embodiment performs two rotations of the table's identifiers column and the temporary identifiers column by the span of each stage. An embodiment computes four variables, corresponding to comparison results of the two stages, optionally performs noise cleaning on the four variables, and computes new contents for the identifier column using appropriate combinations of the variables, the masks, the identifier column and the temporary identifiers column in a manner described herein, thus implementing the sorting. Other embodiments combine three, four, or additional network stages together, in extensions of the methods described herein.

An embodiment uses an equality mask derived from each identification value in the sorted table to generate an intersection table. The equality mask contains ones in indexes that correspond to identifiers in records from the first table that also occur in records from the second table, and zeroes otherwise. Hence a one value indicates that two identifier values are approximately equal to each other, while a zero value indicates that two identifier values are not approximately equal to each other. Because under FHE a polynomial is used to estimate equality, values that are considered approximately equal to each other actually match within a specified amount or tolerance. If isEq( ) denotes a polynomial used to estimate equality, C3_ID denotes the identifier field of the concatenated table, AV denotes a ciphertext with S slots, each holding the adjustment value used in generating the sorted table (e.g., 0.25), and the rot( ) function denotes a rotation function as described elsewhere herein, one embodiment computes the equality mask as isEq(C3_ID, rot(C3_ID-AV, 1)). If C3_ID denotes encrypted identifier field values of the sorted table, C3_F1 denotes encrypted F1 values of the sorted table, and C3_F2 denotes encrypted F2 values of the concatenated table, an embodiment multiplies each element, or row, in the equality mask by a corresponding element in C3_ID to obtain C4_ID, values of the identifier field in an intersection table. An embodiment multiplies each element, or row, in the equality mask by a corresponding element in C3_F1 to obtain C4_F1, values of the field denoted by F1 in an intersection table. An embodiment multiplies each element, or row, in the equality mask by a corresponding element in C3_F2, rotated up by one to account for the previous rotation in the sorted table, to obtain C4_F2, values of the field denoted by F2 in an intersection table. An embodiment concatenates the C4_ID, C4_F1, and C4_F2 together column-wise, thus obtaining an intersection table. The intersection table includes one or more records from the original first table with an identifier value matching a second identifier value in a record in the second plurality of records.

An embodiment derives a not-in-intersection mask from the equality mask. In particular, if eq_mask denotes the equality mask, ones_mask denotes a mask with ones in each index, and the rot( ) function denotes a rotate function as described elsewhere herein, an embodiment computes a not-in-intersection mask using the expression ones_mask-eq_mask-rot (eq_mask, -1). The not-in-intersection mask contains zeroes in indexes that correspond to identifiers in records from either table that also occur in records in the other table, and ones otherwise.

An embodiment uses the not-in-intersection mask to generate a not-in-intersection table, by multiplying each element, or row, in the not-in-intersection mask by a corresponding element in columns of the sorted table, thus obtaining a not-in-intersection table. An embodiment subtracts values in the co-permuted adjustment value column from corresponding values in the identifier column in the not-in-intersection table, thus removing the adjustment value from one or more identifier values originally from the second table. Thus, the not-in-intersection table includes one or more records from either the original first table or the original second table with an identifier value that does not match an identifier value in the other table.

An embodiment adds contents of the intersection table and contents of the not-in-intersection table together, resulting in a join table. Thus, the join table includes records with an identifier value only in the first table, records with an identifier value only in the second table, and records with the same identifier value in both the first and second tables.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or components that are not shown or described herein, or structures or components different from those shown but for a similar function as described herein may be present without departing the scope of the illustrative embodiments.

Furthermore, the illustrative embodiments are described with respect to specific actual or hypothetical components only as examples. Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, computer readable storage media, high-level features, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures.

For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference to FIG. 1, this figure depicts a block diagram of a computing environment 100. Computing environment 100 contains an example of an environment for the execution of at least some of the computer code involved in performing the inventive methods, such as application 200 implementing database table joining under FHE. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105.

The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Measured service: cloud systems automatically control and optimize resource use by leveraging a metering capability at some level of abstraction appropriate to the type of service (e.g., storage, processing, bandwidth, and active user accounts). Resource usage can be monitored, controlled, reported, and invoiced, providing transparency for both the provider and consumer of the utilized service.

Figure 2:
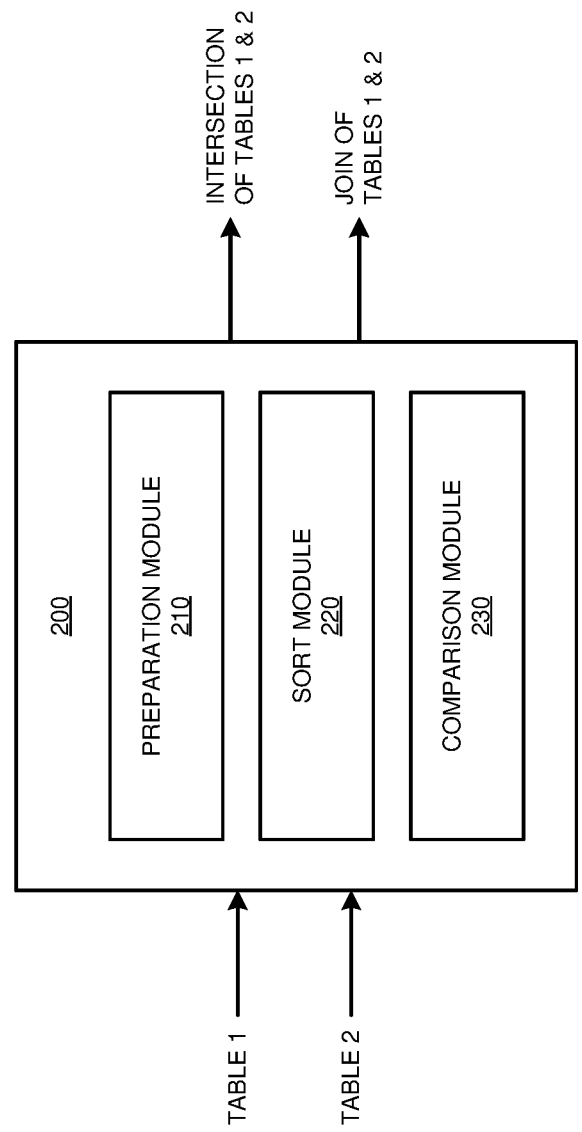
FIG. 2 depicts a block diagram of an example configuration for database table joining under FHE in accordance with an illustrative embodiment.

With reference to FIG. 2, this figure depicts a block diagram of an example configuration for database table joining under FHE in accordance with an illustrative embodiment. Application 200 is the same as application 200 in FIG. 1.

In the illustrated embodiment, application 200 receives two tables to be joined under FHE. Each table has an identifier field and at least one other field (denoted by F1 for the first table and F2 for the second table). The identifier field holds a key shared between both tables. If the keys are not integers, application 200 uses a presently available technique, such as unique hashing, to transform non-integer keys into corresponding integer keys. Application 200's goal is to produce a third table with an identifier field, F1, and F2, including all the records of the first and second tables, such that if a record R1 of the first table and a record R2 of the second table have the same identifier, then the resulting table includes a single record R3 with that shared ID, and with fields F1 (from the first table) and F2 (from the second table). Because the tables include fully homomorphic encrypted data, the tables are to be joined under FHE, without decrypting data in the tables. To manipulate the tables, application 200 uses a presently available FHE scheme that supports SIMD (Single-Instruction-Multiple-Data) operations including addition/subtraction and multiplication. Operations operate element-wise on pairs of vectors encrypted in corresponding pairs of ciphertexts. A rotation operation is also available. A rotation operation rotates row contents up or down within a table. For example, in a rotation up by 1 (e.g., denoted by rot (fieldName, 1)), for a particular field denoted by fieldName, data originally in row 0 of the table is moved to the last row of the table, data originally in row 1 is moved to row 0, data originally in row 2 is moved to row 1, and so on. Similarly, in a rotation down by 1 (e.g., denoted by rot (fieldName, −1)), for a particular field denoted by fieldName, data originally in row 0 of the table is moved to row 1, data originally in row 1 is moved to row 2, data originally in row 2 is moved to row 3, and so on.

Preparation module 210 adds an adjustment value greater than zero and less than 0.5 to a value in the integer identification field of each of the plurality of records in the second table. One implementation of module 210 sets the adjustment value to 0.25. Using the adjustment value ensures that when identifier values are sorted, the records of the second table that correspond to identifiers that also occur in the first table consistently end up after the corresponding records of the first table.

After adding the adjustment value to a value in the identification field of each of the plurality of records in the second table, one implementation of module 210 appends the records in the second table to the records in the first table, thus generating a concatenated table. To add the adjustment value and append records, module 210 uses one or more presently available data manipulation techniques under FHE. For example, if C1_ID denotes encrypted identifier field values of the first table, C2_ID denotes encrypted identifier field values of the second table, C1_F1 denotes encrypted F1 values of the first table, C2_F2 denotes encrypted F2 values of the second table, C3_ID denotes encrypted identifier field values of the concatenated table, C3_F1 denotes encrypted F1 values of the concatenated table, and C3_F2 denotes encrypted F2 values of the concatenated table, there are S records in the first table, and AV denotes the adjustment value, to generated the concatenated table module 210 computes C3_ID=C1_ID+rot(C2_ID+AV, −S), C3_F1=C1_F1, and C3_F2=rot(C2_F2, −S).

Module 210 appends an adjustment value column to the concatenated table. In the column, if a row has an identifier value with an added adjustment value, the column holds the adjustment value. If a row has an identifier value without an added adjustment value, the column holds a zero. The added column is used as described elsewhere herein to remove the added adjustment value from values in the identification field of each of the plurality of records in the second table.

Sort module 220 sorts the concatenated table according to each identification value in the concatenated table. To sort the concatenated table under FHE, module 220 uses a sorting network, a presently available technique. A sorting network is an abstract device including a fixed number of wires and comparators (also called connectors) connecting pairs of wires. Wires can be thought of as running from left to right, carrying values (one per wire) that traverse the network all at the same time. Each comparator connects two wires. When a pair of values, traveling through a pair of wires, encounter a comparator, the comparator swaps the values if and only if the top wire's value is greater or equal to the bottom wire's value. Thus, if the top wire carries x and the bottom wire carries y, then after hitting a comparator the top wire carries x'=min (x, y) and the bottom wire carries y'=max (x, y), so the pair of values is sorted. The connectors of a sorting network are grouped into stages such that every stage includes a sequence of connectors that sort different wires. For example, in a sorting network with inputs 1, 2, 3, and 4 (in order from top to bottom), a first comparator connecting inputs 1 and 3, and a second comparator connecting inputs 2 and 4, these two comparators constitute one stage because the comparators sort different pairs of wires. However, a third comparator also connecting input 1 to another wire cannot be a member of the first stage because the output of the third comparator relies on a result of the first comparator. Comparators that are in the same stage can be computed concurrently because the comparators do not rely on each other's results. A span, or stage distance, of a connector is the number of wires the connector spans minus one. For example, in a sorting network with a first comparator connecting inputs 1 and 3, the span of this comparator is two because the comparator spans three wires (inputs 1, 2, and 3). For case of computation, we assume that the spans of all the connectors in any given stage are equal. Some non-limiting examples of suitable sorting networks that meet this assumption are the Batcher odd-even merge-sort, bitonic sort, and the Pairwise sorting network.

Thus, to sort the concatenated table according to each identification value in the concatenated table, under FHE using a sorting network, module 220 sorts rows in the table stage by stage, at each stage rotating contents of the table's identifier field by the span of the stage and then comparing the original and rotated columns (as vectors). To compare contents of two columns under FHE, module 220 uses a polynomial estimating a Sign function, defined as: Sign(x)=1 if x is negative and 0 otherwise. Module 220 uses the polynomial estimating the Sign function to generate an indicator vector, by defining a LessThan function as: LessThan (X, Y)=Sign(X−Y). As a result, LessThan( ) indicates 1 in vector entries where X<Y for the corresponding vector entries of X and Y, and 0 otherwise. Similarly, module 220 uses the polynomial estimating the Sign function to generate another indicator vector, by defining a GreaterThan function as: GreaterThan(X, Y)=Sign(Y−X). As a result, Greater-Than ( ) indicates 1 in vector entries where X>Y for the corresponding vector entries of X and Y, and 0 otherwise.

Module 220 encodes connectors of each stage of a sorting network into a minimums mask, a maximums mask, and a not_touched mask. The minimums mask encodes a vector with all 0s except 1s in all the indexes that correspond to the high-placed wires of the connectors of the stage, i.e. to the wires that should hold the lesser of the values compared by the connector. Similarly, the maximums mask encodes a vector with all 0s except 1s in all the indexes that correspond to the low-placed wires of the connectors of the stage, i.e. to the wires that should hold the larger of the values compared by the connector. The not_touched mask encodes a vector with all 0s except 1s in all the indexes that are not connected by any connector of the stage. The minimums mask and maximums mask ensure that all the positions that are not connected by any connector in the stage will be 0 in both minimums and maximums, and thus will remain in place.

For each stage, module 220 denotes input contents of the table's identifier field as the ctt ciphertext variable, and rotates contents of the table's identifier field by the span of the stage, generating the ciphertext variable ctt_rot. Module 220 computes a minimums variable, a vector where the lesser values attached to connectors of the stage are placed in the lower positions of the connectors, using the expression minimums=(ctt<ctt_rot)*ctt+ (ctt>ctt_rot)*ctt_rot. Module 220 computes a maximums variable, a vector where the greater values attached to connectors of the stage are placed in the higher positions of the connectors, using the expression maximums=ctt+ctt_rot-minimums, then rotating the maximums variable by the negative of the span of the stage. Module 220 computes contents of the identifier column using the expression ctt=ctt*not_touched_mask+ maximums*maximums_mask+ minimums*minimums_mask, thus implementing the sorting. For another field in the concatenated table, module 220 rotates contents of the field (denoted by the variable field) by the span of the stage, computes a minimums variable using the expression minimums=(ctt<ctt_rot)*field+(ctt>ctt_rot) *field_rot, and a maximums variable, using the expression maximums=field+field_rot-minimums, then rotating the maximums variable by the negative of the span of the stage. Note that the indicators (ctt<ctt_rot) and (ctt>ctt_rot) need not be recomputed for each field. Then module 220 computes contents of the column using the expression field=field*not_touched_mask+ maximums*maximums_mask+ minimums*minimums_mask, thus implementing the sorting according to the identifier field. Note that the sorting is implemented without decrypting contents of the concatenated table, using only operations supported under FHE.

Because comparing contents of two columns under FHE requires use of a polynomial estimating a Sign function, each comparison results not in an integer zero or one, but instead in a real number close to zero or one (e.g., 0.01 or 0.99). Thus, each comparison result can be thought of as an integer zero or one plus an amount of noise. The adjustment value is selected to ensures that when identifier values are sorted, the records of the second table that correspond to identifiers that also occur in the first table end up after the corresponding records of the first table even after added noise is taken into account. In addition, because every sorting network stage requires comparisons, noise accumulates after every stage. Module 220 uses a noise-cleaning polynomial, a presently available technique, to remove a portion of noise from the comparison result after one or more sorting network stages.

Another implementation of module 220 combines sorting network stages together, to reduce the need for post-stage noise removal and reduce the accumulated noise of the sorting network stages. In particular, to combine two sorting network stages, module 220 defines nine masks, each encoding a combination of wire location after the first stage and a wire location after the second stage. Then, for each pair of stages, module 220 starts by executing the first stage on the table's identifiers column to get a temporary identifiers column. Then, module 220 performs two rotations of the table's identifiers column and the temporary identifiers column by the span of each stage. Module 220 computes four variables, corresponding to comparison results of the two stages, optionally performs noise cleaning on the four variables, and computes new contents for the identifier column using appropriate combinations of the variables, the masks, the identifier column and the temporary identifiers column in a manner described herein, thus implementing the sorting. Other implementations of module 220 combine three, four, or additional network stages together, in extensions of the methods described herein.

Comparison module 230 uses an equality mask derived from each identification value in the sorted table to generate an intersection table. The equality mask contains ones in indexes that correspond to identifiers in records from the first table that also occur in records from the second table, and zeroes otherwise. Hence a one value indicates that two identifier values are approximately equal to each other, while a zero value indicates that two identifier values are not approximately equal to each other. Because under FHE a polynomial is used to estimate equality, values that are considered approximately equal to each other actually match within a specified amount or tolerance. If isEq( ) denotes a polynomial used to estimate equality, C3_ID denotes the identifier field of the concatenated table, AV denotes a ciphertext with S slots, each holding the adjustment value used in generating the sorted table (e.g., 0.25), and the rot( ) function denotes a rotation function as described elsewhere herein, one implementation of module 230 computes the equality mask as isEq(C3_ID, rot(C3_ID-AV, 1)). If C3_ID denotes encrypted identifier field values of the sorted table, C3_F1 denotes encrypted F1 values of the sorted table, and C3_F2 denotes encrypted F2 values of the concatenated table, module 230 multiples each element, or row, in the equality mask by a corresponding element in C3_ID to obtain C4_ID, values of the identifier field in an intersection table. Module 230 multiples each element, or row, in the equality mask by a corresponding element in C3_F1 to obtain C4_F1, values of the field denoted by F1 in an intersection table. Module 230 multiples each element, or row, in the equality mask by a corresponding element in C3_F2, rotated up by one to account for the previous rotation in the sorted table, to obtain C4_F2, values of the field denoted by F2 in an intersection table. Module 230 concatenates the C4_ID, C4_F1, and C4_F2 together column-wise, thus obtaining an intersection table. The intersection table includes one or more records from the original first table with an identifier value matching a second identifier value in a record in the second plurality of records.

Module 230 derives a not-in-intersection mask from the equality mask. In particular, if eq_mask denotes the equality mask, ones_mask denotes a mask with ones in each index, and the rot( ) function denotes a rotate function as described elsewhere herein, module 230 computes a not-in-intersection mask using the expression ones_mask-eq_mask-rot (eq_mask, −1). The not-in-intersection mask contains zeroes in indexes that correspond to identifiers in records from either table that also occur in records in the other table, and ones otherwise.

Module 230 uses the not-in-intersection mask to generate a not-in-intersection table, by multiplying each element, or row, in the not-in-intersection mask by a corresponding element in columns of the sorted table, thus obtaining a not-in-intersection table. Module 230 subtracts values in the co-permuted adjustment value column from corresponding values in the identifier column in the not-in-intersection table, thus removing the adjustment value from one or more identifier values originally from the second table. Thus, the not-in-intersection table includes one or more records from either the original first table or the original second table with an identifier value that does not match an identifier value in the other table.

Module 230 adds contents of the intersection table and contents of the not-in-intersection table together, resulting in a join table. Thus, the join table includes records with an identifier value only in the first table, records with an identifier value only in the second table, and records with the same identifier value in both the first and second tables.

Figure 3:
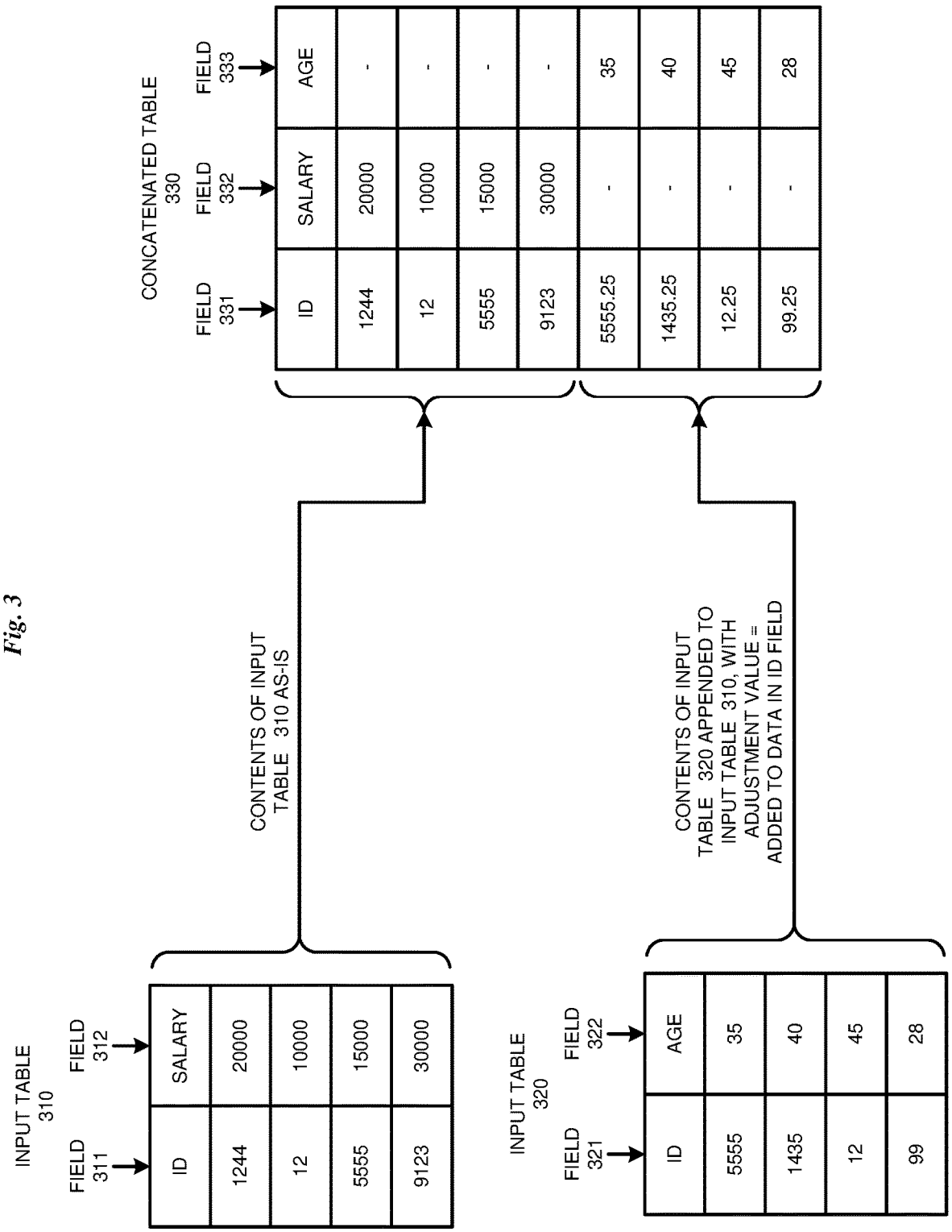
FIG. 3 depicts an example of database table joining under FHE in accordance with an illustrative embodiment.

With reference to FIG. 3, this figure depicts an example of database table joining under FHE in accordance with an illustrative embodiment. The example can be executed using application 200 in FIG. 2.

As depicted, application 200 receives input table 310 and input table 320 to be joined under FHE. Each table has an identifier field (field 311 for input table 310, field 321 for input table 320) and at least one other field (field 312 for input table 310, field 322 for input table 320). Fields 311 and 321 holds a key shared between both tables. Note that, for case of illustration, the example depicts contents of all tables in an unencrypted form, even though data in the tables is actually stored and manipulated in encrypted form, under FHE.

Preparation module 210 adds an adjustment value (here, 0.25) to a value in field 321 of each of the plurality of records in input table 320, and appends the records in input table 320 to the records in input table 310, thus generating concatenated table 330. Concatenated table 330 includes field 331 (the identifier field), field 332 (from field 312 in table 310), and field 333 (from field 322 in table 320).

Figure 4:
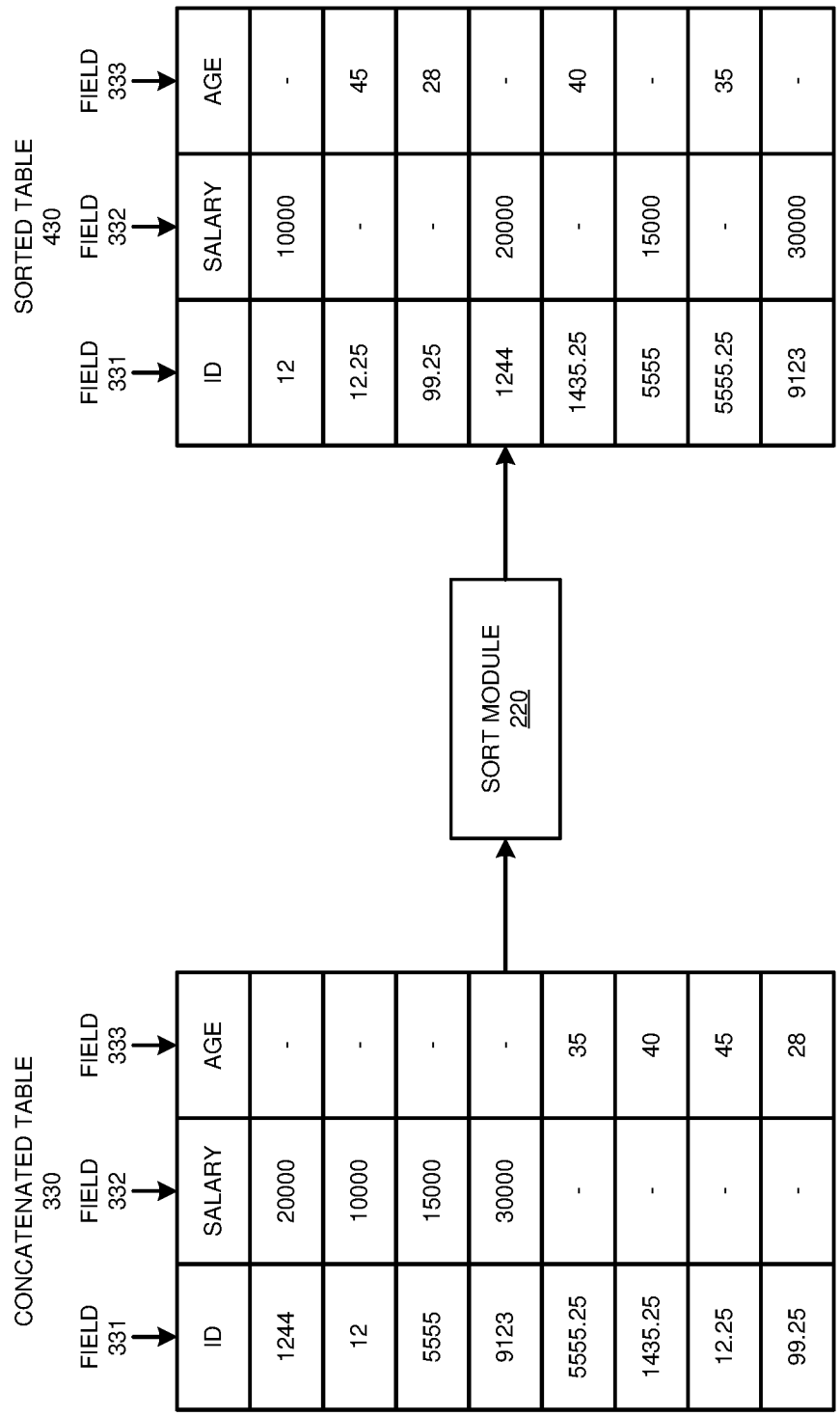
FIG. 4 depicts a continued example of database table joining under FHE in accordance with an illustrative embodiment.

With reference to FIG. 4, this figure depicts a continued example of database table joining under FHE in accordance with an illustrative embodiment. Sort module 220 is the same as sort module 220 in FIG. 2. Concatenated table 330 and fields 331, 332, and 333 are the same as concatenated table 330 and fields 331, 332, and 333 in FIG. 3.

As depicted, sort module 220 sorts the contents of concatenated table 330 according to each identification value (field 331) in concatenated table 330. Results of the sorting are depicted as sorted table 430.

Figure 5:
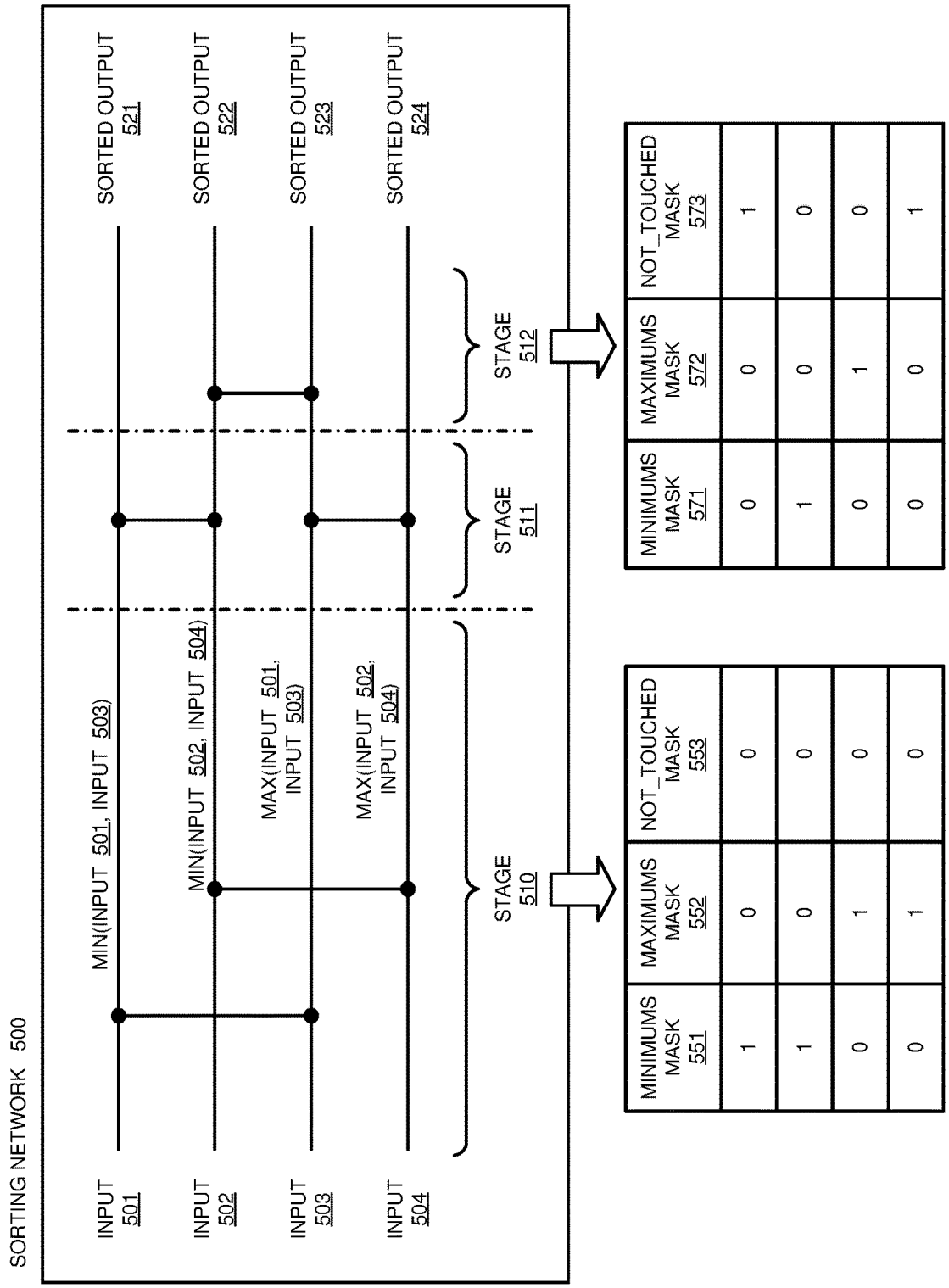
FIG. 5 depicts an example sorting network and masks used in implementing database table joining under FHE in accordance with an illustrative embodiment.

With reference to FIG. 5, this figure depicts an example sorting network and masks used in implementing database table joining under FHE in accordance with an illustrative embodiment.

Sorting network 500 is an abstract device including a fixed number of wires and comparators (also called connectors) connecting pairs of wires. Wires run from left to right, carrying values (one per wire) that traverse the network all at the same time. Each comparator connects two wires. When a pair of values, traveling through a pair of wires, encounter a comparator, the comparator swaps the values if and only if the top wire's value is greater or equal to the bottom wire's value. Thus, if the top wire carries x and the bottom wire carries y, then after hitting a comparator the top wire carries x'=min (x, y) and the bottom wire carries y'=max (x, y), so the pair of values is sorted. The connectors of a sorting network are grouped into stages such that every stage includes a sequence of connectors that sort different wires. For example, in sorting network 500 with inputs 501, 502, 503, and 504, a first comparator compares inputs 501 and 503, and a second comparator compares inputs 502 and 504. These two comparators constitute stage 510 because the comparators sort different pairs of wires. However, a third comparator also connecting input 501 to another wire cannot be a member of the stage 510 because the output of the third comparator relies on a result of the first comparator. Thus, stages 511 and 512 are also depicted. Comparators that are in the same stage can be computed concurrently because the comparators do not rely on each other's results. A span, or stage distance, of a connector is the number of wires the connector spans minus one. For example, in sorting network 500 with a first comparator connecting inputs 501 and 503, the span of this comparator is two because the comparator spans three wires (inputs 501, 502, and 503). After passing through all three stages, sorting network 500 produces sorted outputs 521, 522, 523, and 524, a sorted version of inputs 501, 502, 503, and 504.

Module 220 encodes connectors of stage 510 into minimums mask 551, maximums mask 552, and not_touched mask 553. Minimums mask 551 encodes a vector with all 0s except 1s in all the indexes that correspond to the high wires of the connectors of the stage, i.e. to the wires that should hold the lesser of the values compared by the connector. Similarly, maximums mask 552 encodes a vector with all 0s except 1s in all the indexes that correspond to the low wires of the connectors of the stage, i.e. to the wires that should hold the larger of the values compared by the connector. Not_touched mask 553 encodes a vector with all 0s except 1s in all the indexes that are not connected by any connector of the stage. Similarly, Module 220 encodes connectors of stage 512 into minimums mask 571, maximums mask 572, and not_touched mask 573.

With reference to FIG. 6, this figure depicts example pseudocode used in implementing database table joining under FHE in accordance with an illustrative embodiment.

Pseudocode 610 depicts pseudocode sorting a concatenated table's identifier field. In each stage of a sorting network, the code denotes input contents of the table's identifier field as the ctt variable, and rotates contents of the table's identifier field by the span of the stage, generating the variable ctt_rot (step 1). The code (step 2) computes a minimums variable, a vector where the lesser values attached to connectors of the stage are placed in the lower positions of the connectors. The code (steps 3 and 4) computes a maximums variable, a vector where the greater values attached to connectors of the stage are placed in the higher positions of the connectors. The code (step 5) computes new contents of the identifier column using the expression ctt=ctt*not_touched_mask+ maximums*maximums_mask+ minimums*minimums_mask, thus implementing the sorting.

Pseudocode 620 depicts pseudocode sorting another field in the concatenated table (here, the salary field) according to a concatenated table's identifier field. For another field in the concatenated table, module 220 rotates contents of the field by the span of the stage (step 1), and computes a minimums variable (step 2) and a maximums variable (steps 3 and 4), using contents of the row's identifier field to perform the comparisons. Then (step 5) the code computes contents of the column (denoted by the variable salary) using the expression salary=field*not_touched_mask+ maximums*maximums_mask+ minimums*minimums_mask, thus implementing the sorting according to the identifier field. Note that the sorting is implemented without decrypting contents of the concatenated table, using only operations supported under FHE.

With reference to FIG. 7, this figure depicts another example sorting network and masks used in implementing database table joining under FHE in accordance with an illustrative embodiment.

In particular, sorting network 700 includes two stages. To combine two sorting network stages, module 220 defines mask set 710, including nine masks, each encoding a combination of wire location after the first stage and a wire location after the second stage.

With reference to FIG. 8, this figure depicts example pseudocode used in implementing database table joining under FHE in accordance with an illustrative embodiment.

In particular, pseudocode 810 depicts code combining two sorting network stages, using the nine masks depicted in mask set 710 in FIG. 7. For each pair of stages, the code (step 4) performs two rotations of the table's identifier field by the span of each stage). The code (steps 4-7) computes four variables, corresponding to comparison results of the two stages. The code (step 8) performs noise cleaning on the four variables, and (steps 9 and 10) computes contents of the identifier column using appropriate combinations of the variables and the masks.

Figure 9:
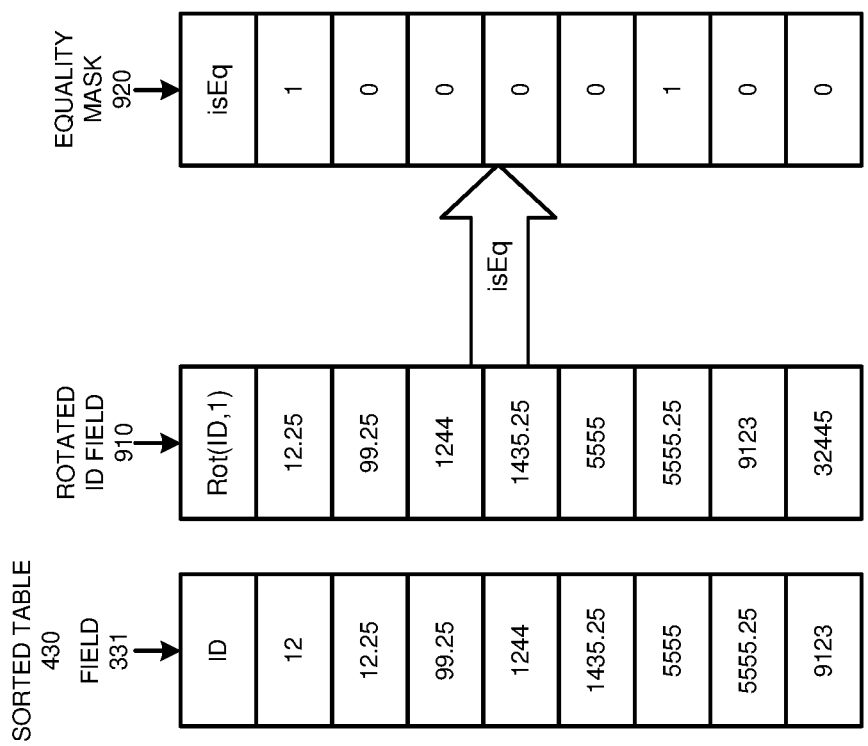
FIG. 9 depicts a continued example of database table joining under FHE in accordance with an illustrative embodiment.

With reference to FIG. 9, this figure depicts a continued example of database table joining under FHE in accordance with an illustrative embodiment. Field 331 is the same as field 331 in FIG. 3. Sorted table 430 is the same as sorted table 430 in FIG. 4.

Rotated identifier field 910 depicts a result of performing a rotation one row up of field 331 in sorted table 430. Equality mask 920 depicts a result of performing the isEq ( ) function on the contents of fields 331 and 910.

Figure 10:
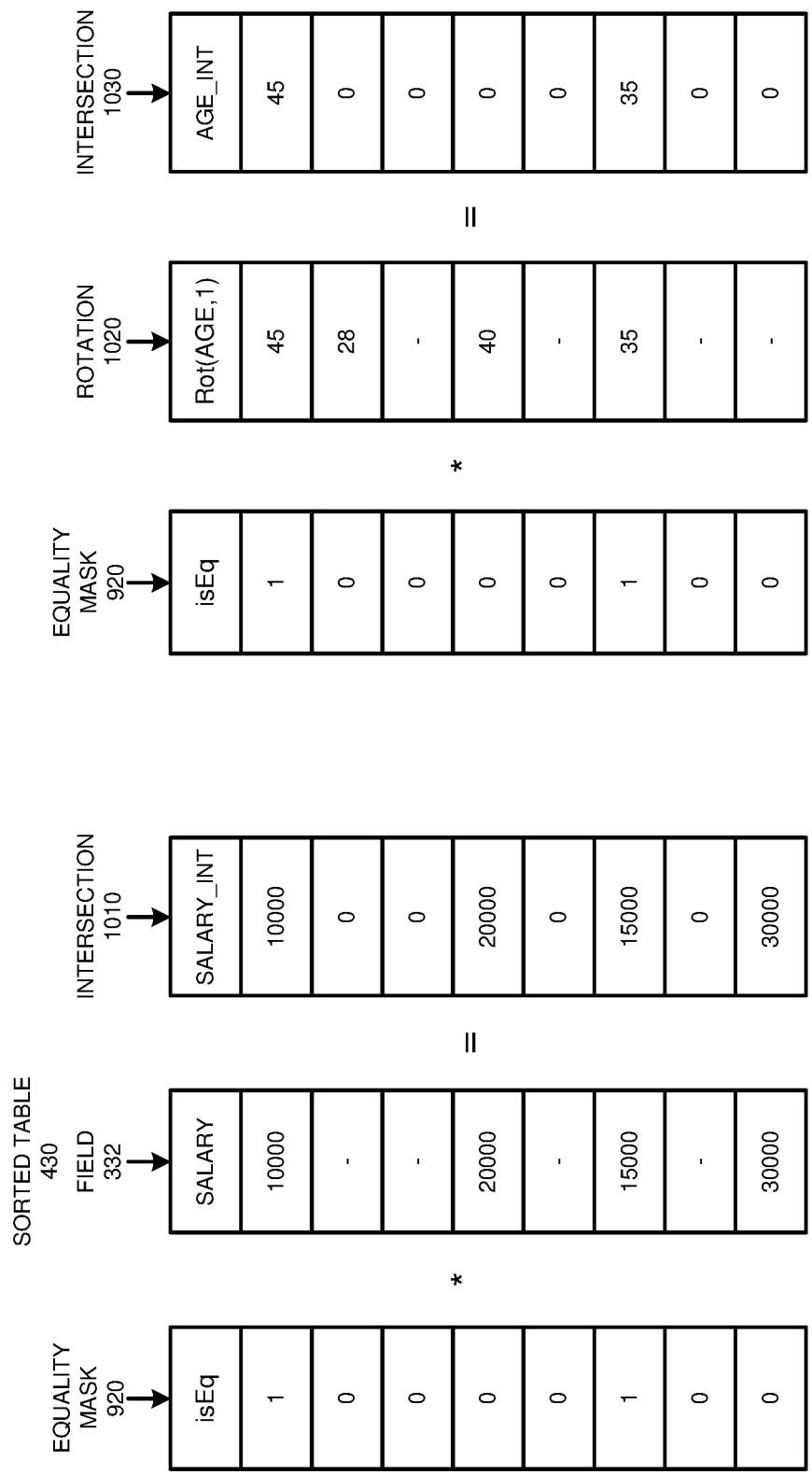
FIG. 10 depicts a continued example of database table joining under FHE in accordance with an illustrative embodiment.

With reference to FIG. 10, this figure depicts a continued example of database table joining under FHE in accordance with an illustrative embodiment. Field 332 is the same as field 332 in FIG. 3. Sorted table 430 is the same as sorted table 430 in FIG. 4. Equality mask 920 is the same as equality mask 920 in FIG. 9.

Intersection 1010 depicts results of multiplying each element, or row, in equality mask 920 by a corresponding element in field 332 to obtain intersection 1010, values of the salary field denoted by field 332. Intersection 1030 depicts results of multiplying each element, or row, in equality mask 920 by a corresponding element in field 332, rotated up by one to account for the previous rotation in the sorted table (depicted as rotation 1020). The result is intersection 1030. Concatenating intersections 1010 and 1030 together column-wise results in an intersection table (not depicted). The intersection table includes one or more records from the original first table with an identifier value matching a second identifier value in a record in the second plurality of records.

Figure 11:
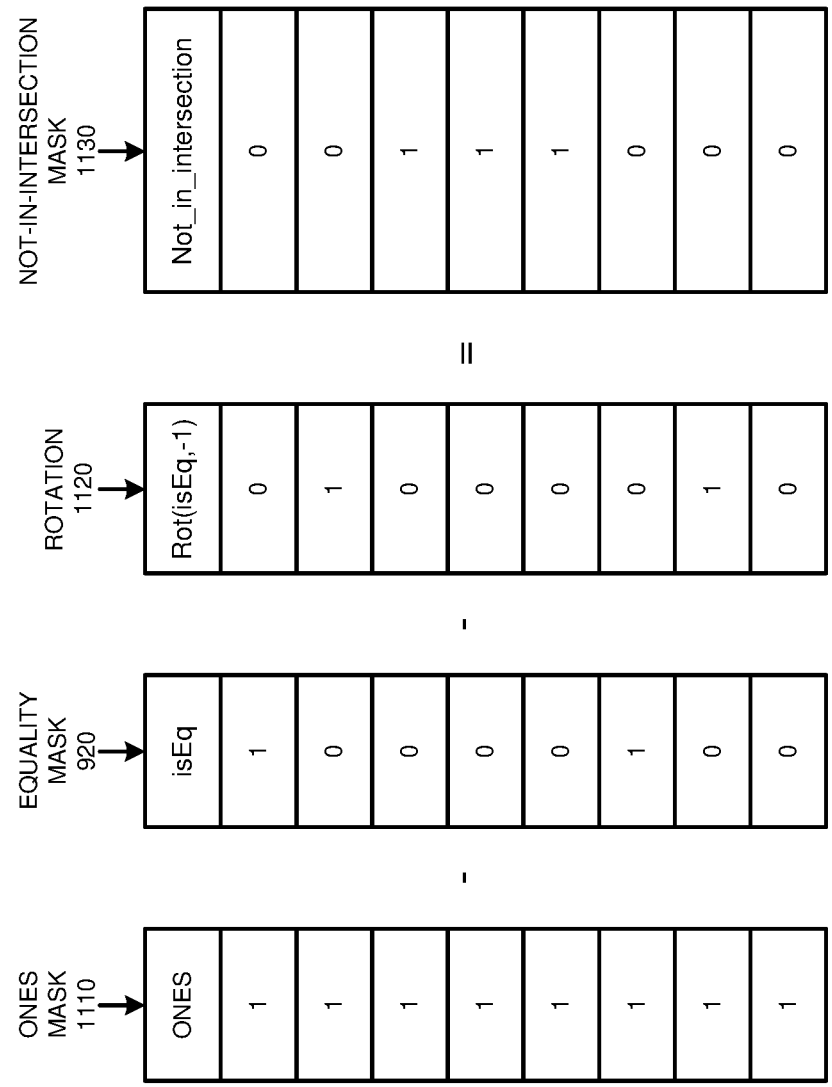
FIG. 11 depicts a continued example of database table joining under FHE in accordance with an illustrative embodiment.

With reference to FIG. 11, this figure depicts a continued example of database table joining under FHE in accordance with an illustrative embodiment. Equality mask 920 is the same as equality mask 920 in FIG. 9.

Ones mask 1110 is a mask with ones in each index. Rotation 1120 is the result of rotating equality mask 920 down by one row. Not-in-intersection mask 1130 is computed using the expression ones mask 1110—equality mask 920—rotation 1120, on corresponding rows of each vector. Not-in-intersection mask 1130 contains zeroes in indexes that correspond to identifiers in records from the first table that also occur in records from the second table, and ones otherwise.

Figure 12:
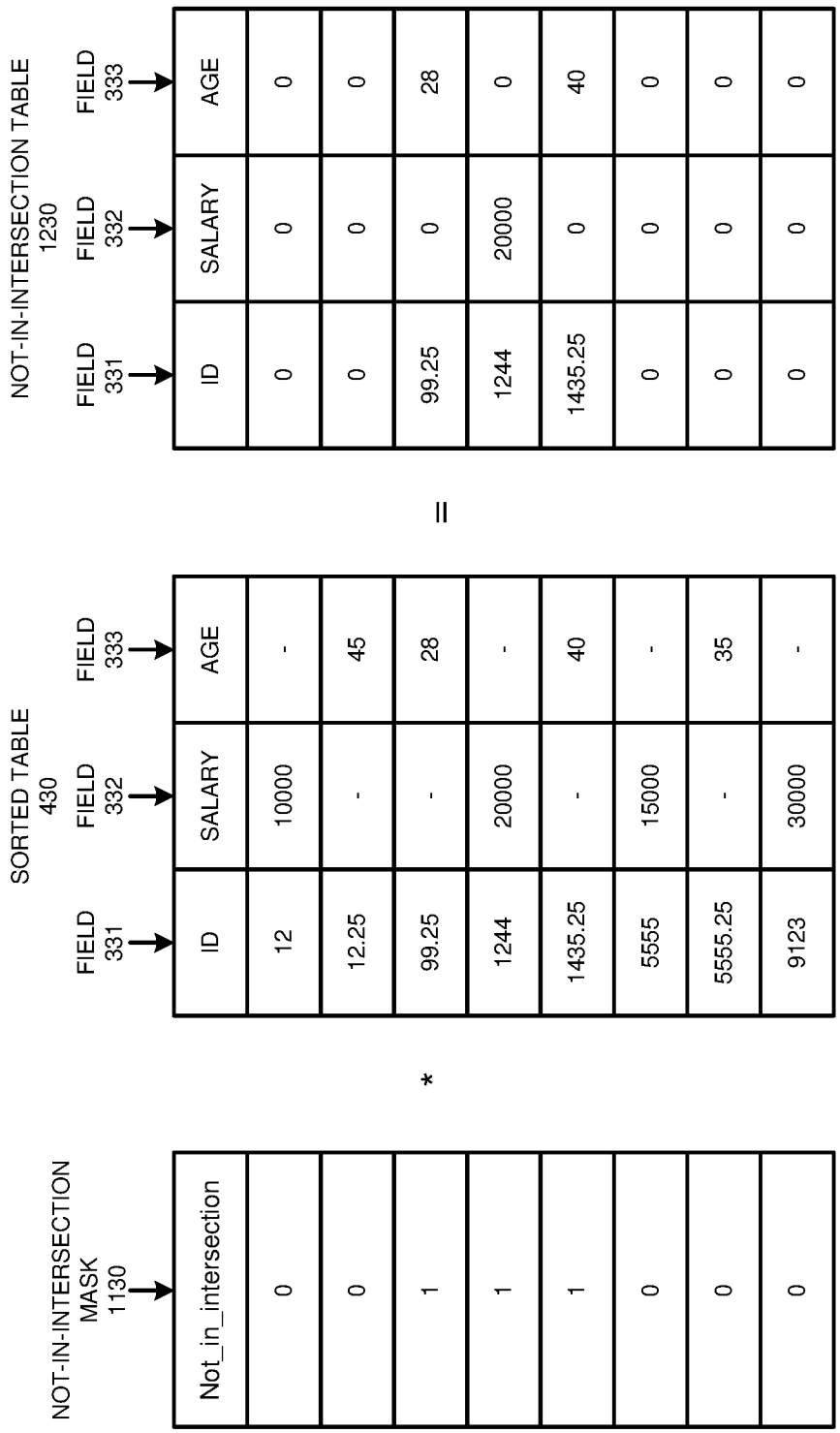
FIG. 12 depicts a continued example of database table joining under FHE in accordance with an illustrative embodiment.

With reference to FIG. 12, this figure depicts a continued example of database table joining under FHE in accordance with an illustrative embodiment. Fields 331, 332, and 333 are the same as fields 331, 332, and 333 in FIG. 3. Sorted table 430 is the same as sorted table 430 in FIG. 4. Not-in-intersection mask 1130 is the same as not-in-intersection mask 1130 in FIG. 11.

Module 230 uses not-in-intersection mask 1130 to generate not-in-intersection table 1230, by multiplying each element, or row, in not-in-intersection mask 1130 by a corresponding element in columns of sorted table 430. In an undepicted step, module 230 subtracts values in the adjustment value column from corresponding values in the identifier column (field 331) in not-in-intersection table 1230, thus removing the adjustment value from one or more identifier values originally from the second table.

Figure 13:
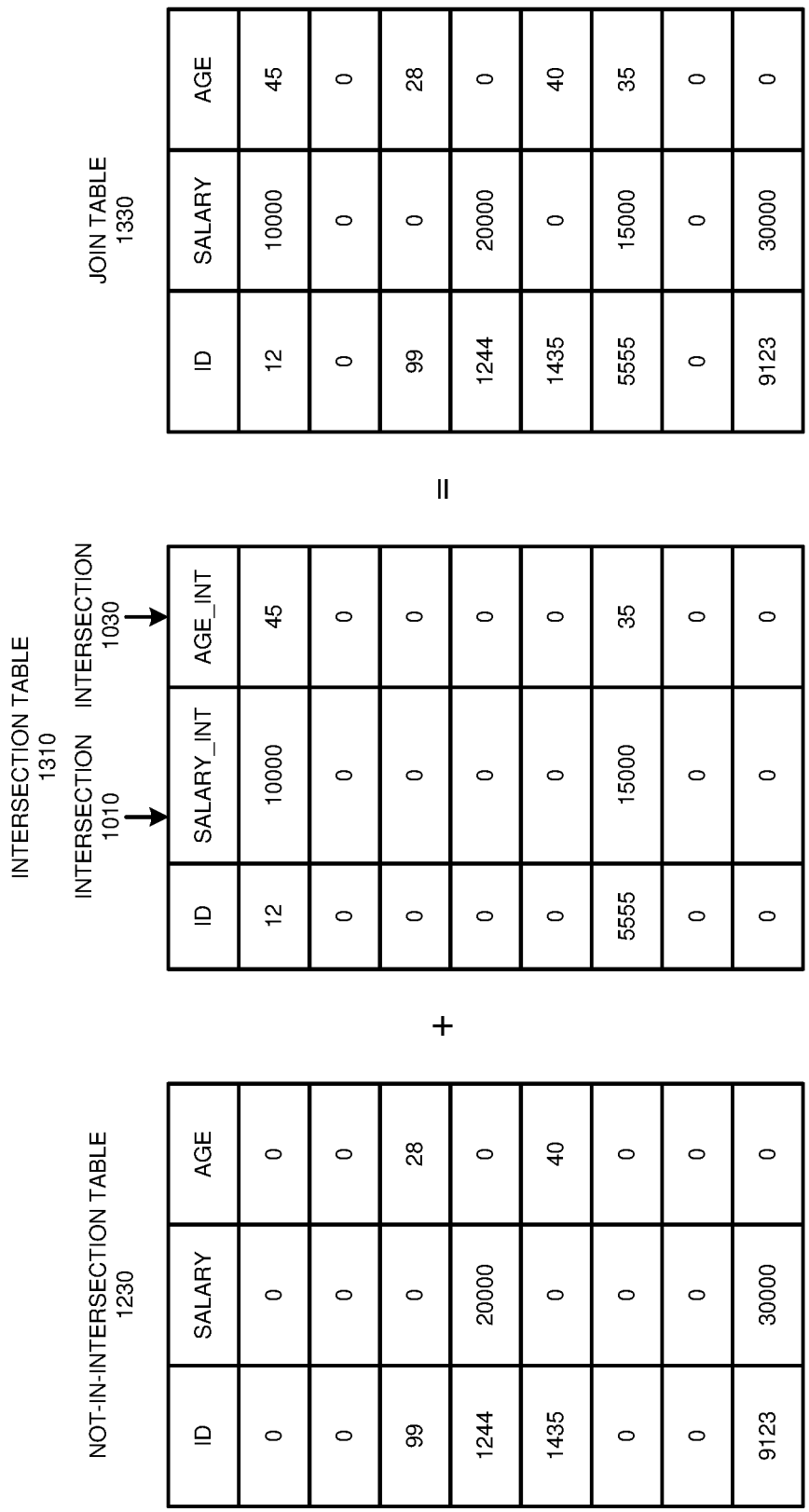
FIG. 13 depicts a continued example of database table joining under FHE in accordance with an illustrative embodiment.

With reference to FIG. 13, this figure depicts a continued example of database table joining under FHE in accordance with an illustrative embodiment. Fields 331, 332, and 333 are the same as fields 331, 332, and 333 in FIG. 3. Sorted table 430 is the same as sorted table 430 in FIG. 4. Intersections 1010 and 1030 are the same as intersections 1010 and 1030 in FIG. 10. Not-in-intersection mask 1130 is the same as not-in-intersection mask 1130 in FIG. 11.

As depicted, module 230 adds contents of intersection table 1310 (including intersections 1010 and 1030) and contents of not-in-intersection table 1230 together, resulting in join table 1330.

Figure 14:
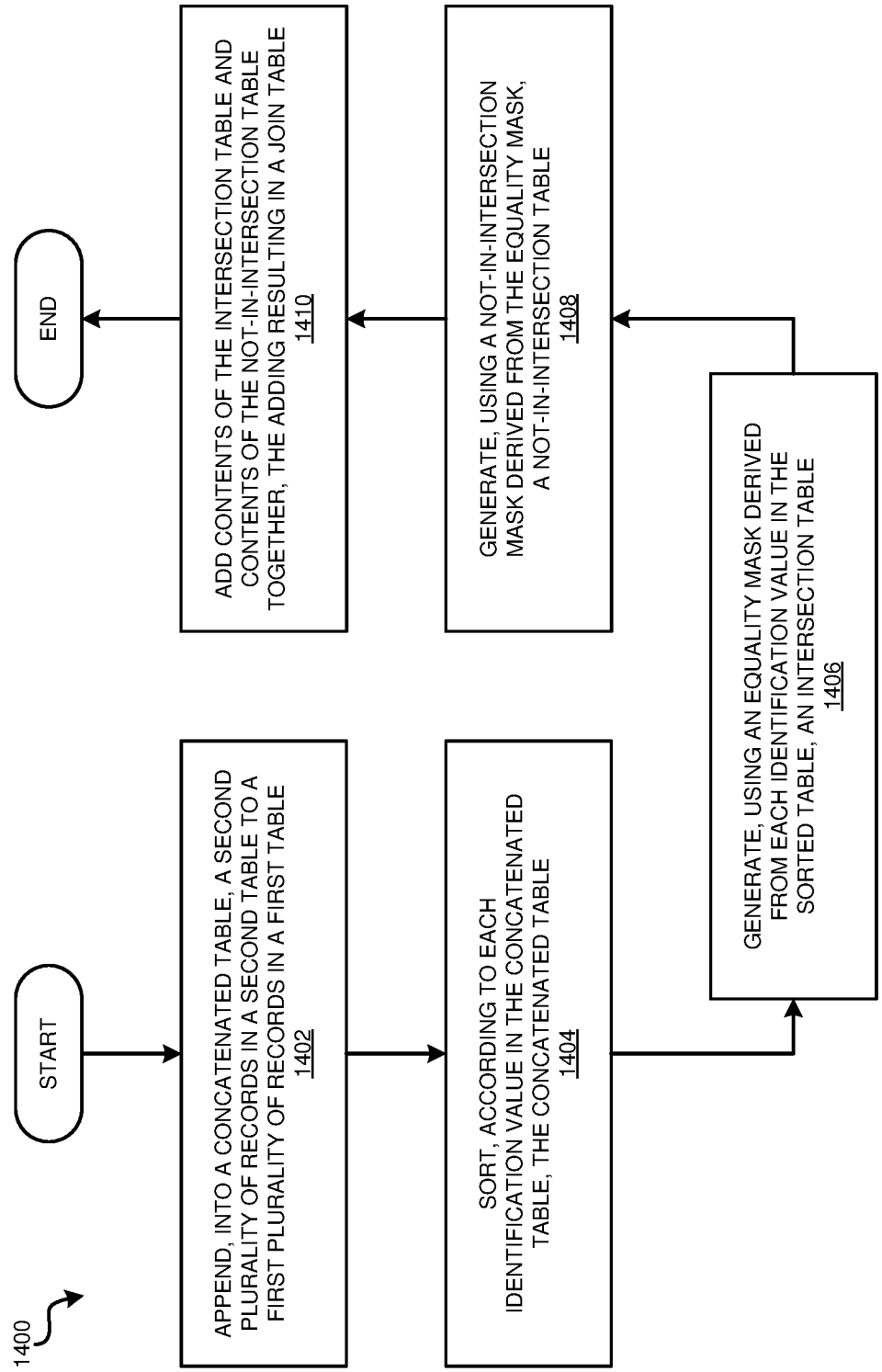
FIG. 14 depicts a flowchart of an example process for database table joining under FHE in accordance with an illustrative embodiment.

With reference to FIG. 14, this figure depicts a flowchart of an example process for database table joining under FHE in accordance with an illustrative embodiment. Process 1400 can be implemented in application 200 in FIG. 3.

In the illustrated embodiment, at block 1402, the process appends, into a concatenated table, a second plurality of records in a second table to a first plurality of records in a first table. At block 1404, the process sorts, according to each identification value in the concatenated table, the concatenated table. At block 1406, the process generates, using an equality mask derived from each identification value in the sorted table, an intersection table. At block 1408, the process generates, using a not-in-intersection mask derived from the equality mask, a not-in-intersection table. At block 1410, the process adds contents of the intersection table and contents of the not-in-intersection table together, the adding resulting in a join table.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method comprising:
    appending, into a concatenated table, a second plurality of records in a second table to a first plurality of records in a first table, wherein the first table and the second table each comprise an identification field storing an identification value, wherein the first plurality of records and the second plurality of records in the second table comprise fully homomorphic encrypted data;
    sorting, according to each identification value in the concatenated table, the concatenated table, the sorting resulting in a sorted table;
    deriving, using each identification value in the sorted table, an equality mask corresponding to the sorted table;
    generating, using the equality mask derived from each identification value in the sorted table, an intersection table, the intersection table comprising a record in the first plurality of records with a first identifier value matching a second identifier value in a record in the second plurality of records;
    deriving, from the equality mask, a not-in-intersection mask;
    generating, using the not-in-intersection mask derived from the equality mask, a not-in-intersection table, the not-in-intersection table comprising a record in the first plurality of records with a third identification value failing to match any identification value in a record in the second plurality of records; and
    adding contents of the intersection table and contents of the not-in-intersection table together, the adding resulting in a join table.

2. The computer-implemented method of claim 1, further comprising: adding an adjustment value greater than zero and less than 0.5 to a value in the identification field of each of the plurality of records in the second table, the adding performed as a part of the appending.

3. The computer-implemented method of claim 1, wherein sorting the concatenated table comprises a plurality of stages, each stage in the plurality of stages comprising a result of comparing a plurality of pairs of identifier values in the sorted table.

4. The computer-implemented method of claim 3, further comprising: computing, by estimating a sign of a subtraction of a first identifier value in each of the plurality of pairs of identifier values from a second identifier value in the pair of identifier values, the results of comparing each of the plurality of pairs of identifier values, the estimating performed using a first polynomial.

5. The computer-implemented method of claim 3, further comprising: removing, from the result of comparing a pair of identifier values in the sorted table, a portion of noise, the removing performed using a second polynomial.

6. The computer-implemented method of claim 1, wherein generating the intersection table comprises multiplying a first value in a first row of the equality mask by a second value in a corresponding row of a first field in the sorted table, the first field present in the first table.

7. The computer-implemented method of claim 1, wherein generating the not-in-intersection table comprises multiplying a first value in a first row of the not-in-intersection mask by a second value in a corresponding row of a first field in the sorted table.

8. A computer program product comprising one or more computer readable storage media, and program instructions collectively stored on the one or more computer readable storage media, the program instructions executable by a processor to cause the processor to perform operations comprising:
    appending, into a concatenated table, a second plurality of records in a second table to a first plurality of records in a first table, wherein the first table and the second table each comprise an identification field storing an identification value, wherein the first plurality of records and the second plurality of records in the second table comprise fully homomorphic encrypted data;
    sorting, according to each identification value in the concatenated table, the concatenated table, the sorting resulting in a sorted table;
    deriving, from each identification value in the sorted table, an equality mask corresponding to the sorted table;
    generating, using the equality mask derived from each identification value in the sorted table, an intersection table, the intersection table comprising a record in the first plurality of records with a first identifier value matching a second identifier value in a record in the second plurality of records;
    deriving, from the equality mask, a not-in-intersection mask;
    generating, using the not-in-intersection mask derived from the equality mask, a not-in-intersection table, the not-in-intersection table comprising a record in the first plurality of records with a third identification value failing to match any identification value in a record in the second plurality of records; and
    adding contents of the intersection table and contents of the not-in-intersection table together, the adding resulting in a join table.

9. The computer program product of claim 8, wherein the stored program instructions are stored in a computer readable storage device in a data processing system, and wherein the stored program instructions are transferred over a network from a remote data processing system.

10. The computer program product of claim 8, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:
    program instructions to meter use of the program instructions associated with the request; and
    program instructions to generate an invoice based on the metered use.

11. The computer program product of claim 8, further comprising:
    adding an adjustment value greater than zero and less than 0.5 to a value in the identification field of each of the plurality of records in the second table, the adding performed as a part of the appending.

12. The computer program product of claim 8, wherein sorting the concatenated table comprises a plurality of stages, each stage in the plurality of stages comprising a result of comparing a plurality of pairs of identifier values in the sorted table.

13. The computer program product of claim 12, further comprising:
computing, by estimating a sign of a subtraction of a first identifier value in each of the plurality of pairs of identifier values from a second identifier value in the pair of identifier values, the results of comparing each of the plurality of pairs of identifier values, the estimating performed using a first polynomial.

14. The computer program product of claim 12, further comprising:
removing, from the result of comparing a pair of identifier values in the sorted table, a portion of noise, the removing performed using a second polynomial.

15. The computer program product of claim 8, wherein generating the intersection table comprises multiplying a first value in a first row of the equality mask by a second value in a corresponding row of a first field in the sorted table, the first field present in the first table.

16. The computer program product of claim 8, wherein generating the not-in-intersection table comprises multiplying a first value in a first row of the not-in-intersection mask by a second value in a corresponding row of a first field in the sorted table.

17. A computer system comprising a processor and one or more computer readable storage media, and program instructions collectively stored on the one or more computer readable storage media, the program instructions executable by the processor to cause the processor to perform operations comprising:
appending, into a concatenated table, a second plurality of records in a second table to a first plurality of records in a first table, wherein the first table and the second table each comprise an identification field storing an identification value, wherein the first plurality of records and the second plurality of records in the second table comprise fully homomorphic encrypted data; sorting, according to each identification value in the concatenated table, the concatenated table, the sorting resulting in a sorted table;
deriving, from each identification value in the sorted table, an equality mask corresponding to the sorted table;
generating, using the equality mask derived from each identification value in the sorted table, an intersection table, the intersection table comprising a record in the first plurality of records with a first identifier value matching a second identifier value in a record in the second plurality of records;
deriving, from the equality mask, a not-in-intersection mask;
generating, using the not-in-intersection mask derived from the equality mask, a not-in-intersection table, the not-in-intersection table comprising a record in the first plurality of records with a third identification value failing to match any identification value in a record in the second plurality of records; and
adding contents of the intersection table and contents of the not-in-intersection table together, the adding resulting in a join table.

18. The computer system of claim 17, further comprising:
adding an adjustment value greater than zero and less than 0.5 to a value in the identification field of each of the plurality of records in the second table, the adding performed as a part of the appending.

19. The computer system of claim 17, wherein sorting the concatenated table comprises a plurality of stages, each stage in the plurality of stages comprising a result of comparing a plurality of pairs of identifier values in the sorted table.

20. The computer system of claim 19, further comprising:
computing, by estimating a sign of a subtraction of a first identifier value in each of the plurality of pairs of identifier values from a second identifier value in the pair of identifier values, the results of comparing each of the plurality of pairs of identifier values, the estimating performed using a first polynomial.

\* \* \* \* \*